US005571462A

United States Patent [19]

Hashimoto et al.

[11] Patent Number: 5,571,462

[45] Date of Patent: Nov. 5, 1996

[54] METHOD OF MANUFACTURING ELECTRIC WIRE INSULATED WITH FOAMED PLASTIC

[75] Inventors: Dai Hashimoto; Shoji Yamamoto, both of Ichihara; Zensuke Iwata, Kamakura, all of Japan

[73] Assignee: The Furukawa Electric Co., Ltd., Tokyo, Japan

[21] Appl. No.: 228,184

[22] Filed: Apr. 15, 1994

Related U.S. Application Data

[63] Continuation of Ser. No. 969,856, Jan. 14, 1993, abandoned.

[30] Foreign Application Priority Data

May 17, 1991 [JP] Japan .................................. 3-113390
May 18, 1992 [WO] WIPO ...................... PCT/JP92/00636

[51] Int. Cl.$^6$ ............................ B29C 44/24; B29C 44/32

[52] U.S. Cl. ....................... 264/45.9; 264/46.4; 264/46.9; 264/53

[58] Field of Search .................................. 264/127, 45.9, 264/51, 53, 46.4, 46.9

[56] References Cited

U.S. PATENT DOCUMENTS

| | | | |
|---|---|---|---|
| 3,278,673 | 10/1966 | Gore | 264/127 |
| 3,896,198 | 7/1975 | Utumi et al. | 264/45.9 |
| 3,972,970 | 8/1976 | Taylor | 264/45.9 |
| 4,107,354 | 8/1978 | Wilkenloh et al. | 264/45.9 |
| 4,304,713 | 12/1981 | Perelman . | |
| 4,352,701 | 10/1982 | Shimba et al. | 264/45.9 |
| 4,368,350 | 1/1983 | Perelman . | |
| 4,529,564 | 7/1985 | Harlow | 264/127 |
| 4,650,815 | 3/1987 | Namba et al. | 264/127 |
| 4,764,538 | 8/1988 | Buckmaster et al. | 521/145 |
| 4,857,390 | 8/1989 | Allen et al. | 428/220 |
| 4,999,146 | 3/1991 | Grimes, Jr. et al. | 264/127 |

FOREIGN PATENT DOCUMENTS

| | | | |
|---|---|---|---|
| 0134666 | 3/1985 | European Pat. Off. . | |
| 64-67324 | 3/1989 | Japan . | |
| 1-93012 | 4/1989 | Japan . | |
| 1-304607 | 12/1989 | Japan . | |
| 3-97746 | 4/1991 | Japan . | |
| 2088775 | 6/1982 | United Kingdom | 264/127 |

*Primary Examiner*—Allan R. Kuhns
*Attorney, Agent, or Firm*—Frishauf, Holtz, Goodman, Langer & Chick, P.C.

[57] ABSTRACT

A method of manufacturing an electric wire insulated with a foamed plastic. The method includes steps of introducing a foaming agent into a fluororesin in a molten state to allow the foaming agent to dispersed in the molten resin, and extruding the molten resin having the foaming agent dispersed therein onto a conductor wire to allow foaming. A fluorine-based foaming agent contains as a main component at least one kind of a fluorocarbon having a molecular weight of about 338 to 488 is used as a foaming agent.

8 Claims, No Drawings

METHOD OF MANUFACTURING ELECTRIC WIRE INSULATED WITH FOAMED PLASTIC

This is a continuation of application Ser. No. 07/969,856, filed Jan. 14, 1993, now abandoned.

TECHNICAL FIELD

The present invention relates to a method of manufacturing an electric wire insulated with a foamed plastic, which can be applied to the manufacture of an insulated electric wire or coaxial cable.

BACKGROUND ART

An electric wire insulated with a foamed plastic, which has a foamed fluoroplastic as an insulating layer is widely used as plenum coaxial cables or signal transmitting electric cables used in electronic equipment. It is known that a fluoroplastic is excellent in flame retardancy, heat resistance, electrical properties, mechanical properties, resistance to chemicals, etc. Further, when the fluoroplastic is foamed, its dielectric constant is lowered. It follows that the above insulated electric wire can shorten the signal transmission delay time, improving the signal transmission speed.

The signal processing capacity of an electric wire insulated with a foamed plastic which used a fluoroplastic is on a sharp increase in recent years. As a result, it is of high importance to diminish the nonuniformity in the signal transmission time. Alternatively, it is required that the signal transmission speed be further improved. To meet these requirements, it is necessary to improve the expansion ratio of the foamed insulating layer of a fluoroplastic and to diminish the nonuniformity in the expansion ratio so as to stabilize the outer diameter of the insulated electric wire. Also, when the insulated wire is used as inner wiring in, for example, a computer, it is required that the thickness of the insulating layer be further diminished and that the diameter of the insulated wire be further diminished in accordance with miniaturization and increased in capacity of the apparatus.

In the conventional methods of manufacturing an electric wire insulated with a foamed plastic, a fluorine-based foaming agent such as a chlorofluoro carbon ($CCl_3F$, $CCl_2F$-$CClF_2$, $CClF_2$-$CF_3$) or hydrochlorofluoro carbon ($CHClF_2$) is introduced into a fluororesin in a molten state. Then, the resin composition containing the foaming agent is extruded to cover a conductor wire, followed by foaming the resin composition so as to manufacture the desired electric wire insulated with a foamed plastic.

However, the fluorine-based foaming agent used in the conventional method contains chlorine doing damage to the ozone layer of the earth. It follows that using such a foaming agent causes an environmental pollution problem.

Also, in the case where an electric wire insulated with a foamed plastic is manufactured by using the fluorine-based foaming agent, the expansion ratio of the insulating layer which has a thickness of at least 0.5 mm is about 60 and 65% at the maximum by volume. Further, the insulated electric wire has wide fluctuations in the expansion ratio of the insulating layer and the outer diameter of the insulated wire, giving rise to spreads in the signal transmission delay time ($\tau$), i.e., $\pm 0.1$ (ns/m), and characteristic impedance ($Z_0$), i.e., $\pm 10(\Omega)$.

A method of manufacturing an electric wire insulated with a foamed plastic, which facilitates decreasing the thickness of the insulating layer and also assists in improving the expansion ratio, is disclosed in Published Unexamined Japanese Patent Application No. 3-97746. In this method, 0.01 to 1 part by volume of a carbon halide or a hydrocarbon halide having a boiling point of at least 0° C., which is used as a foaming agent, is added to 1 part by volume of tetrafluoroethylene-perfluoroalkyl vinyl ether copolymer (PFA) having a melt flow rate of at most 10 g/10 min. The resin composition thus prepared is extruded to cover a conductor wire, followed by foaming the extruded resin composition layer so as to obtain a desired insulated electric wire. This method makes it possible to obtain an insulated electric wire having such a high expansion ratio as at least 70% and such a small thickness of the insulating layer as at most 0.5 mm.

However, the PFA resin used in the above method is not satisfactory in its flow characteristics, that is, its melt flow rate in manufacturing particularly an electric wire insulated with a foamed plastic which has a small outer diameter and a small thickness of an insulating layer, in which a conductor wire has a diameter of at most 0.2 mm and the insulated wire including the insulating layer has an outer diameter of 10 at most 0.6 mm. Specifically, the pressure in the die portion of the extruder is excessively elevated in the extruding step of the resin of PFA because the melt flow rate of the PFA resin is not adequate. It follows that the smoothness of the insulating layer surface is impaired in the manufactured insulated electric wire. Also, the manufactured wire becomes breakable.

Used in the above method as a foaming agent is a carbon halide or hydrocarbon halide having a molecular weight of 66.1 to 287.2 and containing fluorine, chlorine or bromine. To be more specific, the foaming agent used in this method includes, for example, a methane derivative, an ethane derivative, an ethylene derivative and a cyclic compound. In an Example disclosed in this application, trichlorotrifluoroethane (Fron 113) used as a foaming agent is injected into a molten PFA within an extruder by a pump. In this case, the foaming agent, which contains chlorine etc., gives rise to an environmental pollution problem, as pointed out previously. In addition, the foaming agent is decomposed within the extruder because the molten fluororesin such as PFA resin within the extruder has such a high temperature as at least 300° C., giving rise to discoloration of the plastic obtained.

Further, a fluororesin such as PFA is known as having an excellent outer appearance when extruded only in a restricted shearing region. Thus, where a diameter of the die in the extruder is diminished in manufacturing an electric wire with a foamed plastic which has a small outer diameter and a small thickness of an insulating layer by the method disclosed in the Japanese Patent document referred to previously, it is necessary to decrease the wire coating speed and output of the resin. It is also necessary to decrease the injection amount of the foaming agent into the molten resin. Suppose a foaming agent of monochloro difluoro methane ($CHClF_2$: Fron 22) is injected into a molten PFA having a melt flow rate of at most 10 g/10 min in manufacturing a thin insulated electric wire having an outer diameter of at most 0.75 mm, it is necessary to set the injection amount of the foaming agent not to exceed about 0.005 ml/min in order to ensure a sufficient bonding strength between the conductor and the foamed insulating layer. What should be noted is that the injection amount of the foaming agent noted above is close to the lower limit of the flow rate of a precision pump used for the pumping of the foaming agent. Naturally, it is very difficult to control accurately the injection amount of the foaming agent, resulting in failure to obtain an insulated electric wire having a good appearance.

DISCLOSURE OF INVENTION

The present invention, which has been achieved in view of the situation described above, is mainly intended to provide a method of manufacturing an electric wire insulated with a foamed plastic, the insulated wire having an insulating layer of a high expansion ratio and an excellent outer appearance, suitable for use for signal transmission with a high transmission speed, and having a small outer diameter and a small thickness of an insulating layer.

Another object of the present invention is to provide a method of manufacturing the insulated electric wire noted above, which facilitates easily controlling the amount of a foaming agent in the step of forming an insulating layer while suppressing the environmental pollution problem.

According to the present invention, there is provided a method of manufacturing an electric wire insulated with a foamed plastic, comprising steps of introducing a foaming agent into a fluororesin in a molten state to allow the foaming agent to be uniformly dispersed in the molten resin, and extruding the molten resin having the foaming agent dispersed therein onto a conductor wire to allow foaming, wherein the foaming agent is a fluorine-based foaming agent containing as a main component at least one kind of a fluorocarbon having a molecular weight of about 338 to 488.

The particular method of the present invention makes it possible to obtain an electric wire insulated with a foamed plastic, the insulated wire having an insulating layer of a high expansion ratio and an excellent appearance, suitable for use for signal transmission with stable characteristics such as a signal transmission delay time ($\tau$) and with a high signal transmission speed, and having a small thickness of the insulating layer and a small outer diameter.

What should also be noted is that a fluorocarbon which does not contain chlorine, bromine, etc. is used as a main component of the foaming agent in the present invention. This is effective in suppressing the environmental pollution problem. Further, the molecular weight of the fluorocarbon used as the main component of the foaming agent is confined within a predetermined range, with the result that the amount of the foaming agent can be easily controlled in the step of forming an insulating layer.

BEST MODE FOR CARRYING OUT THE INVENTION

In the method of the present invention, a foaming agent is introduced into a fluororesin in a molten state by using, for example, a precision pump, followed by kneading the mixture at a general extruding temperature of the fluororesin, i.e., about 300° to 400° C. As a result, the foaming agent is uniformly dispersed in the molten resin. Then, the molten resin having the foaming agent dispersed therein is extruded onto a conductor wire. Further, the molten fluororesin is foamed under predetermined conditions, followed by cooling so as to obtain an electric wire insulated with a foamed plastic.

An extruder generally used for the manufacture of a resin-insulated electric wire can be used for manufacturing an electric wire insulated with a foamed plastic according to the present invention.

It is important to note that used in the present invention is a fluorine-based foaming agent containing as a main component at least one kind of a fluorocarbon having a molecular weight of about 338 to 488.

The molecular weight of the fluorine-based foaming agent used in the present invention is about 4 to 5 times as much as that of the conventional foaming agent, e.g., monochlorodifluoromethane ($CHClF_2$). Thus, the diffusion rate of the foaming agent within the molten fluororesin is lower than that of the conventional foaming agent, with the result that the cells grow large in the foaming step of the fluororesin on the conductor surface. It follows that the expansion ratio of the insulating layer is increased so as to stabilize the characteristics such as the signal transmission delay time of the insulated electric wire and to improve the signal transmission speed of the insulated electric wire.

What should also be noted is that, where the molecular weight of the fluorocarbon used as a main component of the fluorine-based foaming agent is defined as in the present invention, the amount of the foaming agent injected into the molten fluororesin can be controlled easily, making it possible to obtain without difficulty an electric wire insulated with a foamed plastic, which has a thin insulating layer of a high expansion ratio and an excellent appearance.

In general, the injection amount v of a foaming agent relative to the material to be foamed is known to be determined approximately by the equation given below in the manufacture of a foam:

$$v=n\cdot Mw/\rho$$

where, n is the number of mols of a foaming agent required for obtaining a desired expansion ratio; Mw is the molecular weight of the foaming agent, and $\rho$ is the specific gravity of the foaming agent.

The equation given above indicates that the injection amount v of the foaming agent can be increased with increase in the ratio of the molecular weight to the specific gravity, i.e., $Mw/\rho$.

In the conventional foaming agent of monochloro-difluoromethane, the ratio $Mw/\rho$ is about 73. On the other hand, the fluorocarbon used as a main component of the foaming agent in the present invention has a large molecular weight, with the result that the ratio $Mw/\rho$ is as high as about 190 to 280. It follows that a foaming agent can be injected in a larger amount in the present invention than in the conventional methods where it is intended to form a thin insulating layer comprising a foamed fluoroplastic of a high expansion ratio. Naturally, the injection amount of the foaming agent can be controlled easily particularly when the foaming agent is injected into the molten resin by a precision pump. In addition, it is possible to ensure a sufficient bonding strength between the conductor and the foamed insulating layer as well as an excellent outer appearance of the insulated electric wire. For example, in the manufacture of a thin electric wire insulated with a foamed plastic, which has a small thickness of the insulating layer and an outer diameter of at most 0.75 mm, the injection amount of the foaming agent containing as a main component a fluorocarbon having a molecular weight of about 338 to 488 can be set at a level about 3 to 4 times as large as that of a conventional foaming agent of monochlorodifluoro-methane. It follows that the injection amount of the foaming agent can be controlled very easily in the present invention.

In the case of using as a foaming agent a fluorocarbon or fluorohydrocarbon having a molecular weight of less than about 338, however, it is necessary to set the injection amount of the foaming agent into a molten resin on a low level, making it difficult to control so accurately the injection amount as to inject the foaming agent by using a precision pump. Further, if the injection amount of the foaming agent is smaller, the diffusion velocity of the foaming agent within the molten resin is excessively increased, resulting in failure to reserve the foaming agent within the molten resin particularly when a thin insulating layer is formed on a conductor. It follows that it is difficult to decrease the thickness of the foamed insulating layer. On the other hand, in the case of using as a foaming agent a fluorocarbon or fluorohydrocarbon having a molecular weight exceeding about 488, the diffusion velocity of the foaming agent within the molten resin is excessively lowered, resulting in a failure in increasing the expansion ratio of the foamed insulating layer.

It is desirable to use a compound represented by general formula (1) given below as a fluorocarbon having a molecular weight of about 338 to 488, said fluorocarbon being contained in a fluorine-based foaming agent used in the method of the present invention:

$$C_xF_y \qquad (1)$$

where; x=6, 7, 8 or 9, and y=2x+2.

Specific examples of the fluorocarbon (1) include $C_6F_{14}$ (molecular weight: 338), $C_7F_{16}$ (molecular weight: 388), $C_8F_{18}$ (molecular weight: 438) and $C_9F_{20}$ (molecular weight: 488).

The foaming agent which contains as a main component any one of the above fluorocarbons is generally a liquid at room temperature and under atmospheric pressure. The particular foaming agent is so stable thermally and chemically that it is not decomposed and does not react with the fluororesin at the extruding temperature, i.e., the melt temperature of the fluororesin. Thus, the foaming agent can be stably kneaded with a molten fluororesin to be dispersed uniformly in the molten resin. Even where the above foaming agent is injected into a molten fluororesin, e.g., tetrafluoroethylene-perfluoroalkyl vinyl ether copolymer (PFA), having a temperature of at least 300° C., the foaming agent is not decomposed within the extruder. Naturally, problems such as discoloration of the plastic do not take place.

The fluorine-based foaming agent used in the present invention, which contains a fluorocarbon as a main component, does not contain chlorine or bromine and, thus, is desirable in view of the environmental pollution problem leading to damage done to the ozone layer of the earth.

It is possible for the fluorine-based foaming agent used in the present invention to contain a fluorocarbon whose molecular weight does not fall within a range of between 338 and 488 such as $C_5F_{12}$ having a molecular weight of 288, a fluorohydrocarbon such as $C_9F_{16}H_4$ having a molecular weight of 416, and an organic compound having oxygen as given below in addition to the main component of the fluorocarbon (1) described previously:

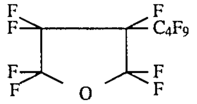

In the method of the present invention, the molten fluororesin can be prepared by having a fluororesin capable of thermally-melting melt within an extruder or the like. The fluororesin capable of thermally-melting includes, for example, tetrafluoroethyleneperfluoroalkyl vinyl ether copolymer (PFA), tetrafluoroethylene-hexafluoropropylene copolymer, ethylene-tetrafluoroethylene copolymer, and tetrafluoroethylene-hexafluoropropene-perfluorovinyl ether copolymer (for example, a copolymer comprising about 80 to 95% by weight of the tetrafluoroethylene units, about 5 to 20% by weight of the hexafluoropropene units and about 0.2 to 6% by weight of the perfluorovinyl ether units).

The flow characteristics of the fluororesin are also important in the method of the present invention. Specifically, when it comes to PFA, tetrafluoro-ethylene-hexafluoropropylene copolymer, and tetrafluoro-ethylene-hexafluoropropene-perfluorovinyl ether copolymer, it is desirable for the fluororesin to exhibit a melt flow rate of at least 10 g/10 min. at a temperature of 372° C. and under a load of 5 kgf. On the other hand, ethylene-tetrafluoroethylene copolymer should desirably exhibit a melt flow rate of at least 5 g/10 min. at a temperature of 297° C. and under a load of 5 kgf. The fluororesin having flow characteristics specified above shows a higher flowability in a thermally-molten state. Accordingly, in the case of manufacturing a thin electric wire insulated with a foamed plastic, which has an outer diameter of at most 1.0 mm and a small thickness of the insulating layer, the pressure in the die portion of the extruder is not excessively increased in the extruding step of the molten resin composition. It follows that it is possible to obtain an insulated electric wire having an excellent outer appearance.

It is desirable to select PFA from among the fluororesins having flow characteristics specified above. Particularly, in the case of using PFA exhibiting a melt flow rate of at least 20 g/10 min. at a temperature of 372° C. and under a load of 5 kgf, it has been confirmed that a shearing region which permits a good outer appearance of the insulated electric wire can be improved.

A plurality of fluororesins having flow characteristics specified above can be used in the form of a mixture in the method of the present invention. For example, it is possible to use a mixture of about 60 to 98% by weight of tetrafluoroethylene-perfluoroalkyl vinyl ether copolymer exhibiting a melt flow rate of at least 10 g/10 min at a temperature of 372° C. and under a load of 5 kgf and about 40 to 2% by weight of tetrafluoroethylene-hexafluoropropylene copolymer exhibiting a similar melt flow rate.

Further, a plurality of fluororesins having the same basic chemical structure and differing from each other in the melt flow rate can also be used in the form of a mixture.

Still further, a nucleating agent such as boron nitride can be added as desired to the fluororesin in the method of the present invention.

Let us describe some Examples of the present invention. Needless to say, the following Examples are intended to facilitate the understanding of the present invention and do not restrict the technical scope of the present invention.

EXAMPLE 1

Used as a fluororesin was PFA340J (tradename of tetrafluoroethylene-perfluoroalkyl vinyl ether copolymer manufactured by Du Pont-Mitsui Fluorochemicals Co., Ltd. and having a melt flow rate of 14 g/10 min under a temperature of 372° C. and a load of 5 kgf). 0.5% by weight of boron nitride acting as a nucleating agent was contained in the fluororesin. The fluororesin containing the nucleating agent was supplied to an extruder and thermally melted within the extruder. Then, injected into the molten resin was Fluorinert FC-75 (tradename of a foaming agent manufactured by Sumitomo 3M Co., Ltd., and containing as a main component $C_8F_{18}$ comprising a straight-chain molecule and having a molecular weight of 438, and a boiling point of 102° C). The resultant mixture was kneaded within the extruder to disperse the foaming agent within the molten resin, and the molten resin was extruded to cover a conductor wire having a diameter of 0.4 mm. Then, the resin in a molten state was foamed on the conductor under predetermined conditions so as to obtain an insulated wire for a coaxial cable, the insulated wire having an outer diameter of 1.6 mm. The center value of the expansion ratio was found to be 60%.

EXAMPLE 2

An insulated wire for a coaxial cable, the insulated wire having an outer diameter of 1.6 mm and a center value of the expansion ratio of 60% was manufactured as in Example 1, except that used as a fluororesin was Tefzel 200 (tradename of ethylene-tetrafluoroethylene copolymer manufactured by Du Pont-Mitsui Fluorochemicals Co., Ltd., having a melt flow rate of 8 g/10 min under a temperature of 297° C. and a load of 5 kgf, and containing 0.5% by weight of boron nitride acting as a nucleating agent).

CONTROL 1

An insulated wire for a coaxial cable was manufactured as in Example 4, except that used as a foaming agent was Freon 22 (tradename of a foaming agent manufactured by Asahi Glass Company, and containing as a main component $CHClF_2$ having a molecular weight of 86.5.)

Characteristics as an electric wire for signal transmission were evaluated for each of the insulated wires manufactured in Examples 1 to 4 and Control 1. To be more specific, a spiral covered shield comprising strand wires each of which has a diameter of 0.05 mm was applied to each of the manufactured insulated wires. Further, the surface of the shield was covered with a PVC jacket. 20 samples each having a length of 1 m were taken at random from each insulated wire having a length of about 100 m. The characteristic impedance ($Z_0$) and signal transmission delay time ($\tau$) of each sample were measured by the ordinary methods so as to determine the scattering. Table 1 shows the results.

TABLE 1

| | Example 1 | Example 2 | Example 3 | Example 4 | Control 1 |
|---|---|---|---|---|---|
| Fluororesin | PFA340J | Telzel200 | SP100 | FEP110J | FEP110J |
| #1MFR (g/10 min) | 14 | 8 | 25 | 16 | 16 |
| Foaming Agent | | #2FluorinertFC-75 | | | Freon22 |
| Main Component of Foaming Agent (Molecular weight) | | $C_8F_{18}$ (438) | | | $CHClF_2$ (86.5) |
| Scattering of $Z_0$ R(Ω) | 2.0 | 4.0 | 2.4 | 3.0 | 8.0 |
| Scattering of τ R(ns/m) | 0.02 | 0.05 | 0.03 | 0.04 | 0.06 |

#1MFR: (PFA3401, SP100, FEP110J) Melt flow rate at a temperature of 372° C. and load of 5 kgf (Tefzel200) Melt flow rate under temperature of 297° C. and load of 5 kgf
#2Fluorinert FC-75 contains about 10% of an organic compound given below as a secondary component:

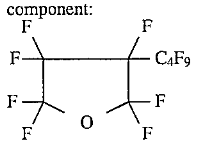

EXAMPLE 3

An insulated wire for a coaxial cable, the insulated wire having an outer diameter of 1.6 mm and a center value of the expansion ratio of 60% was manufactured as in Example 1, except that used as a fluororesin was SP 100 (tradename of tetrafluoroethylene-hexafluoropropene-perfluorovinyl ether copolymer manufactured by Daikin Industries, Ltd., having a melt flow rate of 25 g/10 min under a temperature of 372° C. and a load of 5 kgf, and containing 0.5% by weight of boron nitride acting as a nucleating agent).

EXAMPLE 4

An insulated wire for a coaxial cable was manufactured as in Example 1, except that used as a fluororesin was FEP110J (tradename of tetrafluoroethylene-hexafluoropropylene copolymer manufactured by Du Pont-Mitsui Fluorochemicals Co., Ltd., having a melt flow rate of 16 g/10 min. at a temperature of 372° C. and under a load of 5 kgf, and containing 0.5% by weight of boron nitride acting as a nucleating agent).

In Examples 1 to 4, a relatively thick electric wire insulated with a foamed plastic was manufactured by using a fluorine-based foaming agent containing as a main component at least one kind of a fluorocarbon having a molecular weight falling within a range of between about 338 and 488. As apparent from Table 1, the method of the present invention permits diminishing the scattering of the signal transmission delay time (τ) and the characteristic impedance ($Z_0$) of the manufactured insulated electric wire so as to stabilize the characteristics as an electric wire for signal transmission, compared with the conventional method using a hydrochlorofluorocarbon as a foaming agent.

EXAMPLE 5

Used as a fluororesin was TE9773 (tradename of tetrafluoroethylene-perfluoroalkyl vinyl ether copolymer (PFA) containing 1% by weight of boron nitride, which was manufactured by Du Pont-Mitsui Fluorochemicals Co., Ltd.). The fluororesin was supplied to an extruder and thermally melted within the extruder. Then, injected into the molten resin was Fluorinert FC-77 (tradename of a foaming agent manufactured by Sumitomo 3M Co., Ltd., and containing as a main component $C_8F_{18}$ comprising a straight-chain molecule and having a molecular weight of 438, and a boiling point of 97° C.). The foaming agent was injected under a pressure of about 50 kgf/cm$^2$. The resultant mixture was kneaded within the extruder to disperse the foaming agent within the molten resin, and the molten resin was extruded to cover a conductor wire. Then, the fluororesin in a molten state was foamed on the conductor under predetermined conditions so as to obtain an electric wire insulated with a foamed plastic.

EXAMPLE 6

An electric wire insulated with a foamed plastic was manufactured as in Example 5, except that used as a foaming agent was Fluorinert FC-75 (tradename of a foaming agent manufactured by Sumitomo 3M Co., Ltd., and containing as a main component $C_8F_{18}$ comprising a straight-chain molecule and having a molecular weight of 438, and a boiling point of 102° C.).

CONTROL 2

An electric wire insulated with a foamed plastic was manufactured as in Example 5, except that used as a foaming agent was Freon 22 (tradename of a foaming agent manufactured by Asahi Glass Company, and containing as a main component $CHClF_2$ having a molecular weight of 86.5.)

The expansion ratio (%) of the insulating layer and the signal transmission delay time (ns/m) of the electric wire were measured by ordinary methods with respect to the electric wires insulated a foamed plastic manufactured in Examples 5, 6 and Control 2. Table 2 shows the results.

permits improving the expansion ratio of the insulating layer of the electric wire insulated with a foamed plastic. It follows that the signal transmission delay time of the insulated electric wire is shortened, leading to an improvement in the signal transmission speed.

EXAMPLE 7

Used as a fluororesin capable of thermally-melting was PFA340J (tradename of PFA containing 1% by weight of boron nitride, manufactured by Du Pont-Mitsui Fluorochemicals Co., Ltd. and having a melt flow rate of 14 g/10 min under a temperature of 372° C. and a load of 5 kgf). The fluororesin was supplied to an extruder and thermally melted within the extruder. Then, a foaming agent of Fluorinert FC-77 was injected midway of the extruder cylinder into the molten resin using a precision pump. The resultant mixture was kneaded within the extruder to disperse the foaming agent within the molten resin, and the molten resin was extruded to cover a conductor wire. Then, the fluororesin in a molten state was foamed on the conductor under predetermined conditions so as to obtain an electric wire insulated with a foamed plastic.

EXAMPLE 8

An electric wire insulated with a foamed plastic was manufactured as in Example 7, except that used as a fluororesin was TE9777 (tradename of PFA manufactured by Du Pont-Mitsui Fluorochemicals Co., Ltd., containing 1% by weight of boron nitride, and having a melt flow rate of 30 g/10 min. at a temperature of 372° C. and under a load of 5 kgf).

TABLE 2

| | Example 5 | Example 6 | Control 2 |
|---|---|---|---|
| Fluororesin | TE9773 | TE9773 | TE9773 |
| Foaming Agent | #3 FluorinertFC-77 | #4 FluorinertFC-75 | Freon22 |
| Main Component of Foaming Agent (molecular weight) | $C_8F_{18}$ (438) | $C_8F_{18}$ (438) | $CHClF_2$ (86.5) |
| Expansion Ratio (%) | 69.6 | 65.2 | 63.9 |
| Signal Transmission Delay Time (ns/m) | 3.76 | 3.83 | 3.84 |

#3, #4 Each of Fluorinert FC-77 and Fluorinert FC-77 contains about 10% of an organic compound given below as a secondary component:

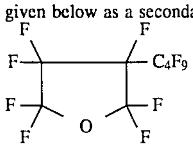

(A)

Additional experiments were conducted as in Example 5, except that used were foaming agents containing as a main component a fluorocarbon having at least 10 carbon atoms (molecular weight of at least 538). No improvement was recognized in the expansion ratio of the insulating layer. A cross section of the electric wire insulated with a foamed plastic was examined. The number of cells in the insulating layer was found to be small, suggesting that the low expansion ratio was due to a slow cell growth.

As apparent from the above results, the particular method of the present invention, in which used as a foaming agent is a fluorine-based foaming agent containing as a main component at least one fluorocarbon having a molecular weight falling within a range of between about 338 and 488,

EXAMPLE 9

An electric wire insulated with a foamed plastic was manufactured as in Example 7, except that used as a fluororesin was a mixture of 20 parts by weight of PFA340J and 80 parts by weight of TE9777, said mixture having a melt flow rate of 20 g/10 min. at a temperature of 372° C. and under a load of 5 kgf.

The outer appearance was observed with respect to each of the electric wires insulated with a foamed plastic manufactured in Examples 7, 8 and 9. Further, the expansion ratio (%) of the insulating layer and the bonding strength between the conductor wire and the insulating layer were measured by the ordinary methods. Table 3 shows the results.

TABLE 3

| | Example 7 | Example 8 | Control 2 |
|---|---|---|---|
| Fluororesin | PFA340J | TE9777 | TE9777/PFA340J (80/20) |
| #5MFR (g/10 min) | 14 | 30 | 20 |
| Foaming Agent | | #6FluorinertFC-77 | |
| Main Component of Foaming Agent (Molecular weight) | | $C_8F_{18}$ (438) | |
| Specific Gravity of Forming Agent | 1.78 | 1.78 | 1.78 |
| Injection Amount of Foaming Agent (ml/min.) | 0.021 | 0.021 | 0.021 |
| Diameter of Conductor Wire (mm) | 0.19 | 0.19 | 0.19 |
| Outer Diameter of Electric Wire insulated with Foamed Plastic (mm) | 0.58 | 0.59 | 0.57 |
| Expansion Ratio (%) | 71.9 | 73.2 | 74.5 |
| Outer Appearance | ○ | ○ | ○ |
| Bonding Strength (gf/100 mm) | 25 | 40 | 30 |

#5MFR: Melt flow rate at a temperature of 372° C. and a load of 5 kgf
#6Fluorinert FC-77: Foaming agent equal to that used in Example 5

CONTROL 3

The procedure equal to that in Example 7 was followed in an attempt to manufacture an electric wire insulated with a foamed plastic, except that used as a foaming agent was Freon 113 (tradename of a foaming agent manufactured by Asahi Glass Company, containing as a main component $CCl_2F\text{-}CClF_2$ (molecular weight of 187.4) and having a specific gravity of 1.565). However, discoloration of a plastic took place, resulting in failure to manufacture an insulated electric wire, as indicated in Table 4.

CONTROL 4

An electric wire insulated with a foamed plastic was manufactured as in Example 7, except that used as a foaming agent was Freon 22 (tradename of a foaming agent manufactured by Asahi Glass Company, containing as a main component $CHClF_2$ (molecular weight of 86.5) and having a specific gravity of 1.194). However, the bonding strength between the conductor wire and the fluorocarbon resin was so low that it was impossible to fluororesin as indicated in Table 4.

CONTROL 5

An electric wire insulated with a foamed plastic was manufactured as in Example 7, except that used as a foaming agent was Fluorinert FC-40 (tradename of a foaming agent manufactured by Sumitomo 3M Co., Ltd., containing as a main component $C_{12}F_{26}$, which comprises a straight-chain molecule and has a molecular weight of 638, and having a specific gravity of 1.87).

The outer appearance of the electric wire with a foamed plastic manufactured in Control 5 was observed. Further, the expansion ratio (%) and the bonding strength between the conductor wire and the insulating layer were measured by the ordinary methods. Table 4 shows the results.

TABLE 4

| | Control 3 | Control 4 | Control 5 |
|---|---|---|---|
| Fluororesin | PFA340J | PFA340J | PFA340J |
| #7MFR (g/10 min) | 14 | 14 | 14 |
| Foaming Agent | Freon113 | Freon22 | FluorinertFC-40 |
| Main component of Foaming Agent (Molecular weight) | $CCl_2F—CClF_2$ (187.4) | $CHClF_2$ (86.5) | $C_{12}F_{26}$ (638) |
| Specific Gravity of Forming Agent | 1.565 | 1.194 | 1.87 |
| Injection Amount of Foaming Agent (ml/min.) | 0.021 | 0.005 | 0.030 |
| Diameter of Conductor Wire (mm) | 0.19 | 0.19 | 0.19 |
| Outer Diameter of Electric Wire insulated with Foamed Plastic (mm) | — | — | 0.55 |
| Expansion Ratio (%) | — | — | 52.7 |
| Outer Appearance | — | ○ | ○ |
| Bonding Strength (gf/100 mm) | — | 0 | 40 |
| State of Electric Wire insulated with Foamed Plastic | Discoloration of a plastic took place. | An insulating layer was not sufficiently bonded onto a conductor wire. | An expansion ratio of an insulating layer was insufficient. |

#7MFR: Melt flow rate at a temperature of 372° C. and a load of 5 kgf

As apparent from comparison between Tables 3 and 4, the method of the present invention is markedly advantageous over the conventional method. Specifically, used as a foaming agent in the present invention is a fluorine-based foaming agent containing as a main component at least one fluorocarbon having a molecular weight ranging between about 338 and 488. Further, the particular method of the present invention, in which used as a fluororesin is PFA exhibiting a melt flow rate exceeding 10 g/10 min. at a temperature of 372° C. and under a load of 5 kgf, permits manufacturing an electric wire insulated with a foamed plastic, which has an insulating layer of a high expansion ratio and good outer appearance. Particularly, it was possible to control very easily the injection amount of the fluorine-based foaming agent in Examples 7 to 9.

We claim:

1. A method of manufacturing an electric wire insulated with a foamed plastic, comprising the steps of:

introducing a foaming agent into a fluororesin in a molten state to allow said foaming agent to be uniformly dispersed in said molten resin; and extruding the molten resin having said foaming agent dispersed therein onto a conductor wire having a small diameter to allow foaming of said fluororesin at an expansion ratio of at least 60% by volume so as to obtain an electric wire insulated with the foamed fluororesin, said insulated wire having an outer diameter of 1.6 mm or less, wherein said foaming agent comprises a fluorocarbon compound represented by formula (1) given below:

$$C_xF_y \quad (1)$$

where x is 7, 8, or 9 and y is 2x+2; and said fluororesin comprises at least one copolymer selected from the group consisting of a tetrafluoroethylene-perfluoroalkyl vinyl ether copolymer exhibiting a melt flow rate exceeding 10 g/10 min. at a temperature of 372° C. and under a load of 5 kgf, a tetrafluoroethylene-hexafluoropropylene copolymer exhibiting a melt flow rate exceeding 10 g/10 min. at a temperature of 372° C. and under a load of 5 kgf, and an ethylene-tetrafluoroethylene copolymer exhibiting a melt flow rate exceeding 5 g/10 min. at a temperature of 297° C. and under a load of 5 kgf.

2. The method according to claim 1, wherein said foaming agent contains as a main component a fluorocarbon compound represented by chemical formula of $C_8F_{18}$.

3. The method according to claim 1, wherein said foaming agent contains as a main component a fluorocarbon compound represented by chemical formula of $C_8F_{18}$, and said fluororesin comprises tetrafluoroethylene-perfluoroalkyl vinyl ether copolymer exhibiting a melt flow rate exceeding 10 g/10 min. at a temperature of 372° C. and under a load of 5 kgf.

4. The method according to claim 3, wherein said molten resin containing said foaming agent is foamed at an expansion ratio of 60 to 74.5% by volume.

5. The method according to claim 1, wherein said insulated wire has an outer diameter of 1.0 mm or less.

6. The method according to claim 5, wherein said foamed resin layer has a thickness of 0.6 mm or less.

7. The method according to claim 1, wherein said foamed resin layer has a thickness of 0.6 mm or less.

8. The method according to claim 3, wherein said foamed resin layer has a thickness of 0.19 mm to 0.6 mm.

* * * * *